(12) United States Patent
Gugumus

(10) Patent No.: US 7,652,081 B2
(45) Date of Patent: Jan. 26, 2010

(54) STABILIZER MIXTURES

(75) Inventor: François Gugumus, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 243 days.

(21) Appl. No.: 11/498,349

(22) Filed: Aug. 3, 2006

(65) Prior Publication Data

US 2006/0270763 A1    Nov. 30, 2006

Related U.S. Application Data

(63) Continuation of application No. 10/276,091, filed as application No. PCT/EP01/05870 on May 22, 2001, now abandoned.

(51) Int. Cl.
*C08K 5/3492* (2006.01)
*C08K 5/3435* (2006.01)

(52) U.S. Cl. .................. 524/100; 524/102; 252/403

(58) Field of Classification Search ............. 524/100, 524/102; 252/403
See application file for complete search history.

(56) References Cited

U.S. PATENT DOCUMENTS

| | | | | |
|---|---|---|---|---|
| 3,640,928 A * | 2/1972 | Murayama et al. | ............ | 524/99 |
| 4,086,204 A * | 4/1978 | Cassandrini et al. | ........ | 524/101 |
| 4,108,829 A * | 8/1978 | Cassandrini et al. | ........ | 524/101 |
| 4,198,334 A * | 4/1980 | Rasberger | .................. | 524/102 |
| 4,331,586 A * | 5/1982 | Hardy | ........................ | 525/186 |
| 4,477,615 A * | 10/1984 | Raspanti et al. | ............ | 524/100 |
| 4,529,760 A * | 7/1985 | Leistner et al. | ............. | 524/102 |
| 4,619,956 A * | 10/1986 | Susi | ............................ | 524/87 |
| 4,619,958 A * | 10/1986 | Haruna et al. | ............... | 524/102 |
| 4,692,486 A | 9/1987 | Gugumus | .................. | 524/100 |
| 4,863,981 A * | 9/1989 | Gugumus | .................... | 524/97 |
| 4,929,652 A * | 5/1990 | Gugumus | .................... | 524/91 |
| 5,071,981 A * | 12/1991 | Son et al. | .................... | 544/198 |
| 5,679,733 A * | 10/1997 | Malik et al. | .................. | 524/99 |
| 5,719,217 A | 2/1998 | Gugumus | .................. | 524/100 |
| 5,817,821 A | 10/1998 | Valet et al. | ................. | 546/188 |
| 5,919,399 A | 7/1999 | Gugumus | .................. | 252/403 |
| 5,965,643 A | 10/1999 | Gugumus | .................. | 524/100 |
| 5,980,783 A | 11/1999 | Gugumus | .................. | 252/401 |
| 6,015,849 A * | 1/2000 | Gugumus | .................. | 524/100 |
| 6,020,406 A | 2/2000 | Gugumus | .................... | 524/95 |
| 6,046,304 A * | 4/2000 | Borzatta et al. | ............. | 528/423 |
| 6,126,861 A | 10/2000 | Bechtold | .................... | 252/401 |
| 6,368,520 B1 * | 4/2002 | Gugumus | .................. | 252/401 |

FOREIGN PATENT DOCUMENTS

| | | |
|---|---|---|
| EP | 0345220 | 12/1989 |
| EP | 0476612 | 3/1992 |
| EP | 0 632 092 | 1/1995 |
| WO | 97/39051 | 10/1997 |
| WO | 99/05206 | 2/1999 |
| WO | 00/18833 | 4/2000 |

OTHER PUBLICATIONS

Derwent Abstract 2001-301887/32 for EP 1078929 (2001).

* cited by examiner

*Primary Examiner*—Kriellion A Sanders
(74) *Attorney, Agent, or Firm*—Shiela A. Loggins

(57) ABSTRACT

A stabilizer mixture containing
(I) one low molecular weight alkylated sterically hindered amine compound; and
(II) one high molecular weight alkylated sterically hindered amine compound.

8 Claims, No Drawings

STABILIZER MIXTURES

This is a Continuation of application Ser. No. 10/276,091, filed on Nov. 11, 2002 now abandoned, which is the National Stage of International Application PCT/EP01/05870, filed May 22, 2001, the contents of which is herein entirely incorporated by reference.

The present invention relates to a stabilizer mixture containing one specific low molecular weight alkylated sterically hindered amine compound and one specific high molecular weight alkylated sterically hindered amine compound, the use of this mixture for stabilizing an organic material, in particular a polyolefin, against degradation induced by light, heat or oxidation and the organic material thus stabilized.

The stabilization of polyolefins is described in numerous publications, for example in U.S. Pat. No. 4,692,468, U.S. Pat. No. 4,863,981, U.S. Pat. No. 5,719,217, U.S. Pat. No. 6,015,849, U.S. Pat. No. 6,020,406, U.S. Pat. No. 5,965,643, U.S. Pat. No. 5,980,783, U.S. Pat. No. 5,919,399, U.S. Pat. No. 5,817,821, U.S. Pat. No. 6,126,861 and EP-A-345,220. An UV light stabilization additive package for solar cell module and laminated glass applications is disclosed in WO-A-99/05,206.

In more detail, the present invention relates to a stabilizer mixture containing (I) one sterically hindered amine compound selected from the group consisting of the classes ($\alpha$-1), ($\alpha$-2), ($\alpha$-3), ($\alpha$-4) and ($\alpha$-5); and (II) one sterically hindered amine compound selected from the group consisting of the classes ($\beta$-1), ($\beta$-2), ($\beta$-3) and ($\beta$-4);

($\alpha$-1) a compound of the formula (A-1)

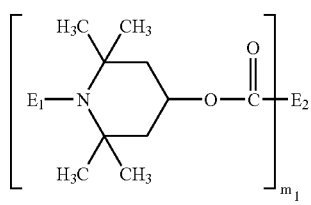

(A-1)

in which
$E_1$ is $C_1$-$C_4$alkyl,
$m_1$ is 1, 2 or 4,
if $m_1$ is 1, $E_2$ is $C_1$-$C_{25}$alkyl,
if $m_1$ is 2, $E_2$ is $C_1$-$C_{14}$alkylene or a group of the formula (a-I)

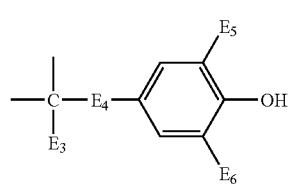

(a-I)

wherein $E_3$ is $C_1$-$C_{10}$alkyl or $C_2$-$C_{10}$alkenyl, $E_4$ is $C_1$-$C_{10}$alkylene, and $E_5$ and $E_6$ independently of one another are $C_1$-$C_4$alkyl, cyclohexyl or methylcyclohexyl, and
if $m_1$ is 4, $E_2$ is $C_4$-$C_{10}$alkanetetrayl;

($\alpha$-2) a compound of the formula (A-2)

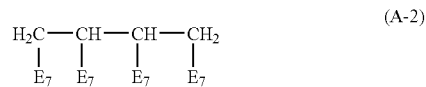

(A-2)

in which
two of the radicals $E_7$ are —COO—($C_1$-$C_{20}$alkyl), and
two of the radicals $E_7$ are a group of the formula (a-II)

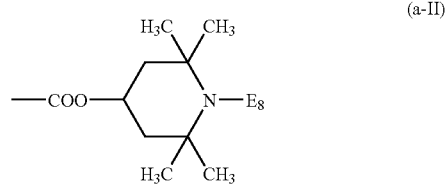

(a-II)

with $E_8$ having one of the meanings of $E_1$;

($\alpha$-3) a compound of the formula (A-3)

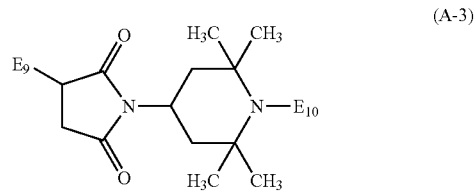

(A-3)

in which
$E_9$ is $C_1$-$C_{24}$alkyl, and
$E_{10}$ has one of the meanings of $E_1$;

($\alpha$-4) a compound of the formula (A-4)

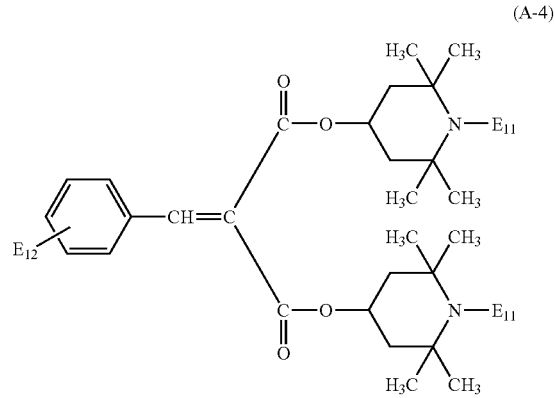

(A-4)

wherein
the radicals $E_{11}$ independently of one another have one of the meanings of $E_1$,
and $E_{12}$ is hydrogen, $C_1$-$C_{12}$alkyl or $C_1$-$C_{12}$alkoxy;

(α-5) a compound of the formula (A-5)

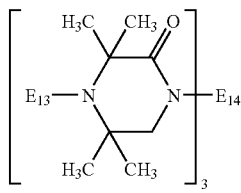

wherein
$E_{13}$ has one of the meanings of $E_1$, and
$E_{14}$ is a group of the formula (a-III)

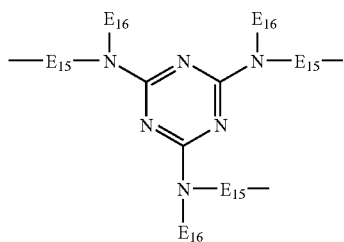

wherein the radicals $E_{15}$ independently of one another are $C_2$-$C_{12}$alkylene, and the radicals $E_{16}$ independently of one another are $C_1$-$C_{12}$alkyl or $C_5$-$C_{12}$cycloalkyl;

(β-1) a compound of the formula (B-1)

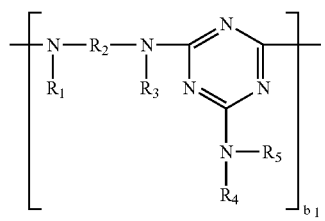

in which
$R_1$, $R_3$, $R_4$ and $R_5$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (b-I)

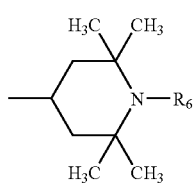

$R_2$ is $C_2$-$C_{18}$alkylene, $C_5$-$C_7$cycloalkylene or $C_1$-$C_4$alkylenedi($C_5$-$C_7$cycloalkylene), or the radicals $R_1$, $R_2$ and $R_3$, together with the nitrogen atoms to which they are bonded, perform a 5- to 10-membered heterocyclic ring, or
$R_4$ and $R_5$, together with the nitrogen atom to which they are bonded, form a 5- to 10-membered heterocyclic ring,
$R_6$ is $C_1$-$C_4$alkyl, and
$b_1$ is a number from 2 to 50,
with the proviso that at least one of the radicals $R_1$, $R_3$, $R_4$ and $R_5$ is a group of the formula (b-I);

(β-2) a compound of the formula (B-2)

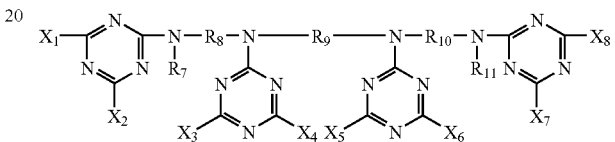

wherein
$R_7$ and $R_{11}$, independently of one another are hydrogen or $C_1$-$C_{12}$alkyl,
$R_8$, $R_9$ and $R_{10}$ independently of one another are $C_2$-$C_{10}$alkylene, and
$X_1$, $X_2$, $X_3$, $X_4$, $X_5$, $X_6$, $X_7$ and $X_8$ independently of one another are a group of the formula (b-II),

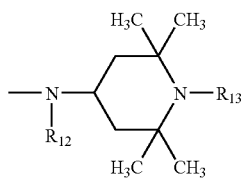

in which $R_{12}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (b-I) as defined above, and
$R_{13}$ has one of the meanings of $R_6$;

(β-3) a compound of the formula (B-3)

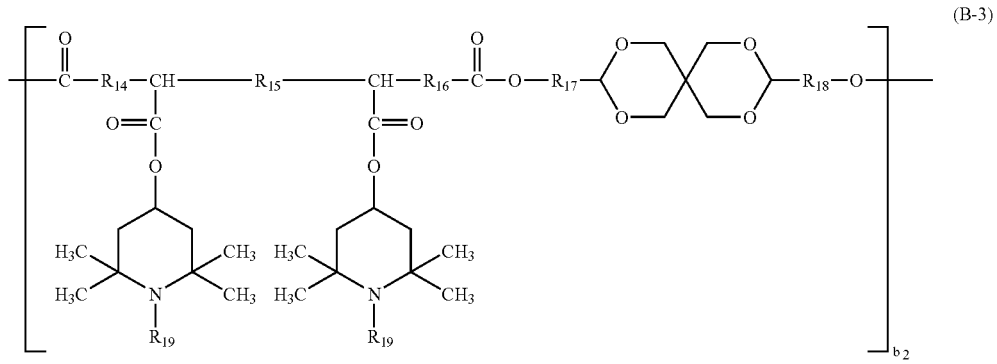

in which $R_{14}$, $R_{15}$, $R_{16}$, $R_{17}$ and $R_{18}$ independently of one another are a direct bond or $C_1$-$C_{10}$alkylene, $R_{19}$ has one of the meanings of $R_6$, and $b_2$ is a number from 1 to 50;

(β-4) a product (B-4) obtainable by reacting a product, obtained by reaction of a polyamine of the formula (B-4-1) with cyanuric chloride, with a compound of the formula (B-4-2)

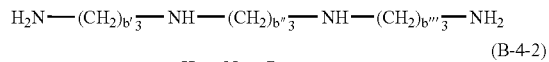

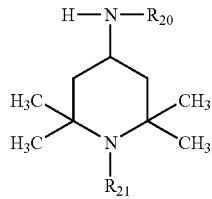

in which $b'_3$, $b''_3$ and $b'''_3$ independently of one another are a number from 2 to 12, $R_{20}$ is hydrogen, $C_1$-$C_{12}$alkyl, $C_5$-$C_{12}$cycloalkyl, phenyl or $C_7$-$C_9$phenylalkyl, and $R_2$, has one of the meanings of $R_6$.

Examples of alkyl having up to 25 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethyl-butyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl. $E_1$, $E_8$, $E_{10}$, $E_{11}$, $E_{13}$, $R_6$, $R_{13}$, $R_{19}$ and $R_2$, are preferably methyl. $R_{20}$ is preferably butyl.

Examples of alkoxy having up to 12 carbon atoms are methoxy, ethoxy, propoxy, isopropoxy, butoxy, isobutoxy, pentoxy, isopentoxy, hexoxy, heptoxy, octoxy, decyloxy and dodecyloxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

—OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$-$C_9$phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of alkylene having up to 18 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_4$-$C_{10}$alkanetetrayl is 1,2,3,4-butanetetrayl.

An example of $C_5$-$C_7$cycloalkylene is cyclohexylene.

An example of $C_1$-$C_4$alkylenedi($C_5$-$C_7$cycloalkylene) is methylenedicyclohexylene.

Where the radicals $R_1$, $R_2$ and $R_3$, together with the nitrogen atoms to which they are attached, form a 5- to 10-membered heterocyclic ring, this ring is for example

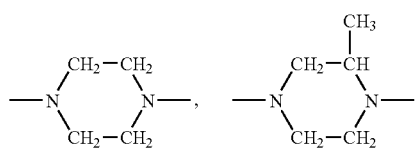

A 6-membered heterocyclic ring is preferred.

Where the radicals $R_4$ and $R_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

$R_{15}$ is preferably a direct bond.

$b_1$ is preferably a number from 2 to 25, in particular 2 to 20.

$b_2$ is preferably a number from 1 to 25, in particluar 1 to 20.

$b'_3$ and $b'''_3$ are preferably 3 and $b''_3$ is preferably 2.

The compounds described above as components (I) and (II) are essentially known. Most of them are commercially available. All of them can be prepared by known processes.

The preparation of the compounds of component (I) is disclosed, for example, in U.S. Pat. No. 5,679,733, U.S. Pat. No. 3,640,928, U.S. Pat. No. 4,198,334, U.S. Pat. No. 4,619,958, U.S. Pat. No. 4,619,956, GB-A-2,269,819 and U.S. Pat. No. 5,071,981.

The preparation of the compounds of component (II) is disclosed, for example, in U.S. Pat. No. 4,086,204, U.S. Pat. No. 6,046,304, U.S. Pat. No. 4,331,586, U.S. Pat. No. 4,108,829, U.S. Pat. No. 4,529,760 and U.S. Pat. No. 4,477,615.

The product (B-4) can be prepared analogously to known processes, for example by reacting a polyamine of formula (B-4-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6,6-tetramethyl-4-piperidylamine of the formula (B-4-2). The molar ratio of the 2,2,6,6-tetramethyl-4-piperidylamine to polyamine of the formula (B-4-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (B-4-1) to cyanuric chloride to 2,2,6,6-tetramethyl-4-piperidylamine of the formula (B-4-2) is preferably from 1:3:5 to 1:3:6.

The following example indicates one way of preparing the preferred product (B-4-a).

Example: 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 29.0 g (0.128 mol) of N-(1,2,2,6,6-pentamethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 19.4 g (0.085 mol) of N-(1,2,2,6,6-penta-methyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120-130° C. in vacuo (0.1 mbar). The desired product is obtained as a colourless resin.

In general, the product (B-4) can, for example, be represented by a compound of the formula (B-4-α), (B-4-β) or (B-4-γ). It can also be in the form of a mixture of these three compounds.

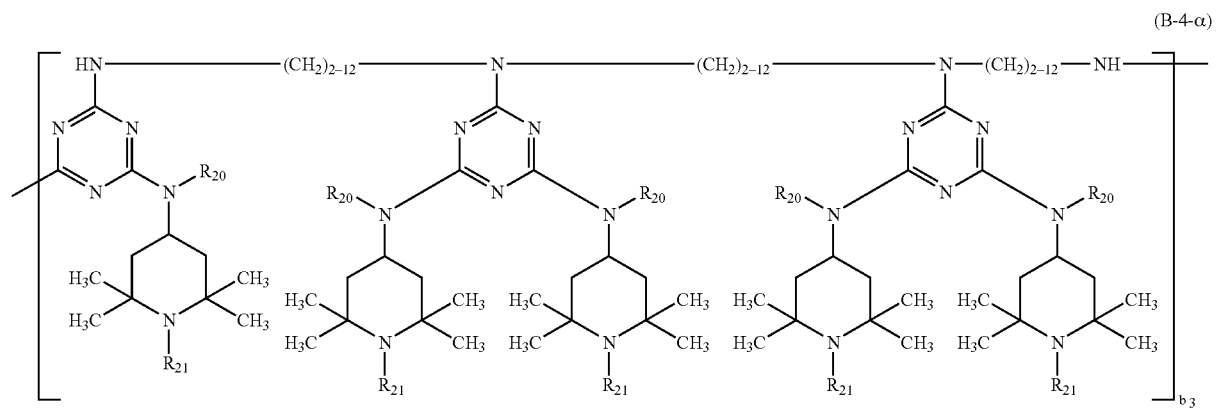

(B-4-α)

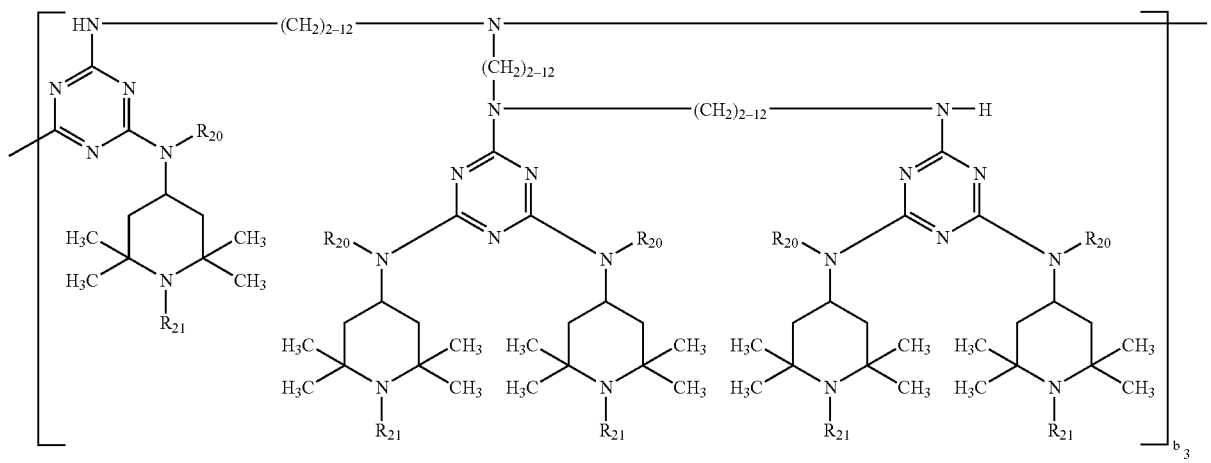
(B-4-β)
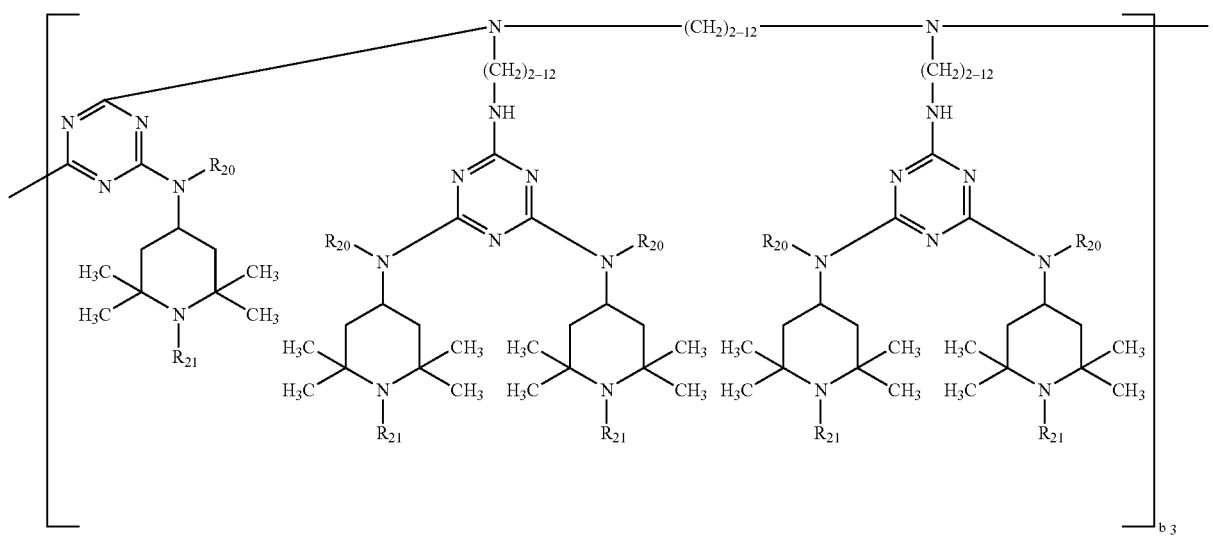
(B-4-γ)
A preferred meaning of the formula (B-4-α) is
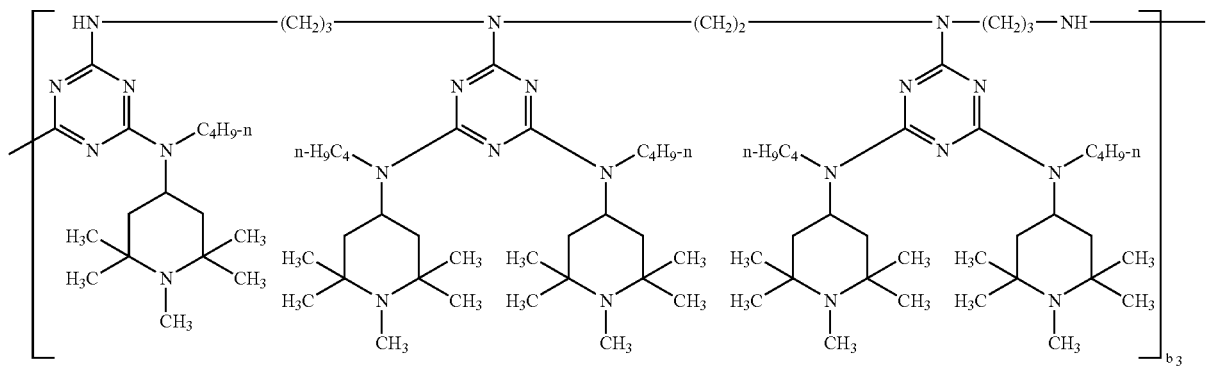

A preferred meaning of the formula (B-4-β) is
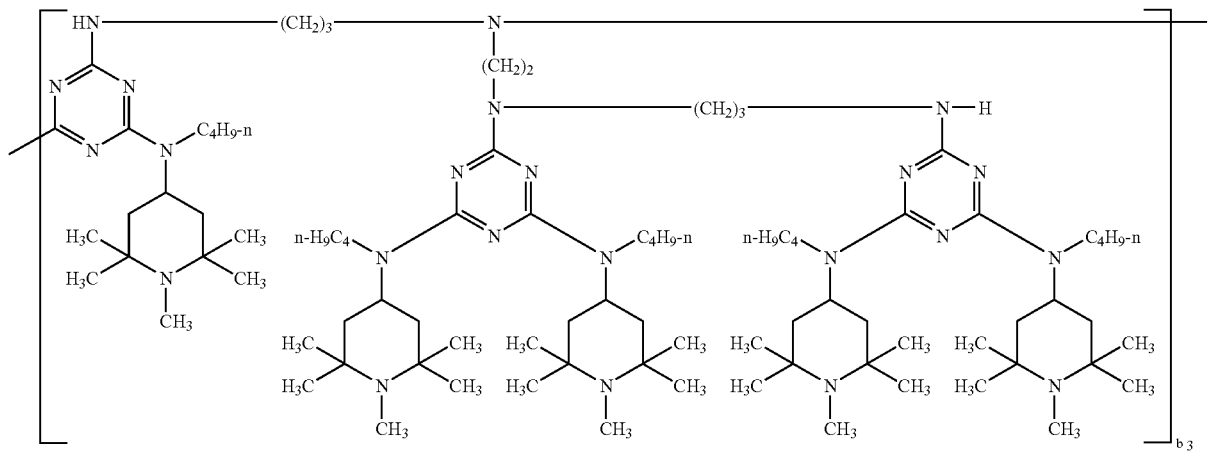
A preferred meaning of the formula (B-4-γ) is
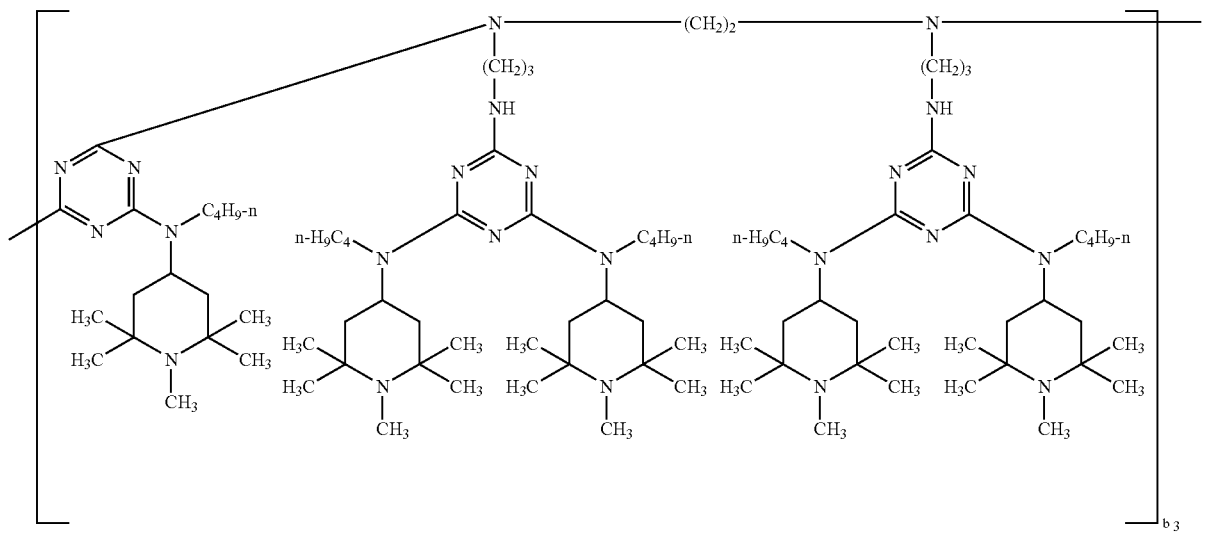

In the above formulae (B-4-α) to (B-4-γ), b₃ is preferably 2 to 20, in particular 2 to 10.

The sterically hindered amine compound of component (I) is preferably selected from the group consisting of the following commercial products:

TINUVIN 765 (RTM), TINUVIN 144 (RTM), ADK STAB LA-52 (RTM), ADK STAB LA-62 (RTM), SANDUVOR 3056 (RTM), SANDUVOR PR 31 (RTM) and GOODRITE UV 3159 (RTM).

The N-methylated form (methylation of the nitrogen in the 2,2,6,6-tetramethyl-4-piperidinyl group) of the commercial product DASTIB 845 (RTM) can easily be obtained by known processes for example in analogy to the method described in U.S. Pat. No. 6,046,304, Example 2. The compound so obtained is also preferably used as component (I).

The sterically hindered amine compound of component (II) is preferably selected from the group consisting of the following commercial products:

CYASORB UV 3529 (RTM), CHIMASSORB 119 (RTM) and ADK STAB LA-63 (RTM).

The N-methylated form (methylation of the nitrogen in the 2,2,6,6-tetramethyl-4-piperidinyl group) of the commercial products CHIMASSORB 944 (RTM), CHIMASSORB 2020 (RTM) and UVASORB HA 88 (RTM) can also easily be obtained by known processes for example in analogy to the same method as described above. The compounds so obtained are likewise preferably used as component (II).

The meanings of the terminal groups which saturate the free valences in the compounds of the formulae (B-1), (B-3), (B-4-α), (B-4-β) and (B-4γ) depend on the processes used for their preparation. The terminal groups can also be modified after the preparation of the compounds.

If the compounds of the formula (B-1) are prepared by reacting a compound of the formula

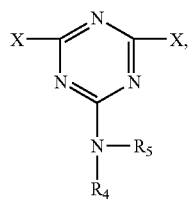

in which X is, for example, halogen, in particular chlorine, and R₄ and R₅ are as defined above, with a compound of the formula

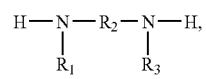

in which R₁, R₂ and R₃ are as defined above, the terminal group bonded to the diamino radical is hydrogen or

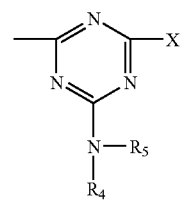

and the terminal group bonded to the triazine radical is X or

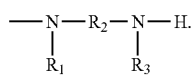

If X is halogen, it is advantageous to replace this, for example, by —OH or an amino group when the reaction is complete. Examples of amino groups which may be mentioned are pyrrolidin-1-yl, morpholino, —NH₂, —N(C₁-C₈)alkyl)₂ and —NR(C₁-C₈alkyl), in which R is hydrogen or a group of the formula (b-I).

The compounds of the formula (B-1) also cover compounds of the formula

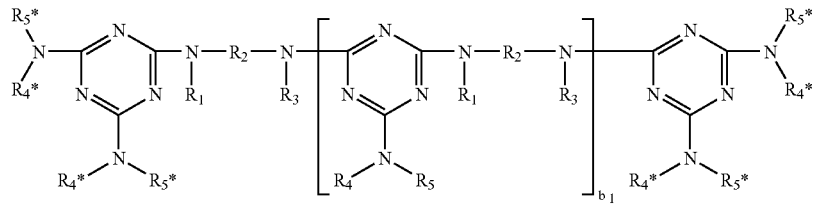

wherein $R_1$, $R_2$, $R_3$, $R_4$, $R_5$ and $b_1$ are as defined above and $R_4^*$ has one of the meanings of $R_4$ and $R_5^*$ has one of the meanings of $R_5$.

One of the particularly preferred compounds of the formula (B-1) is

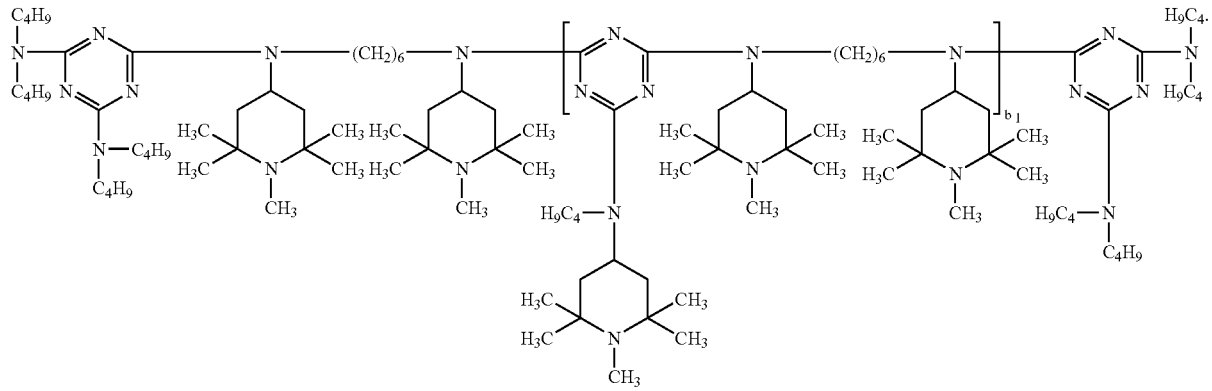

The preparation of this compound is generically described e.g. in U.S. Pat. No. 6,046,304.

In the compounds of the formula (B-3), the terminal group bonded to the carbonyl radical is, for example,

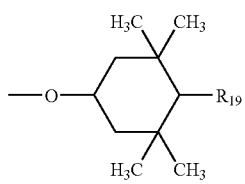

and the terminal group bonded to the oxygen radical is, for example,

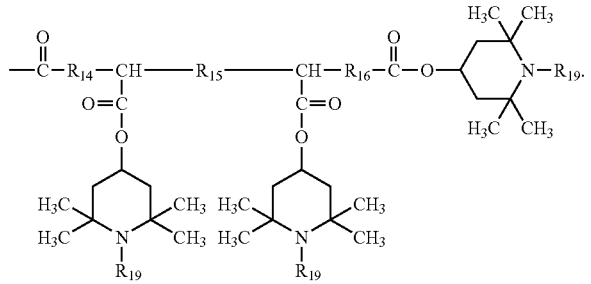

In the compounds of the formulae (B-4-α), (B-4-β) and (B-4-γ), the terminal group bonded to the triazine radical is, for example, Cl or a

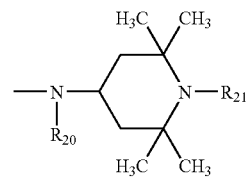

group, and the terminal group bonded to the amino radical is, for example, hydrogen or a

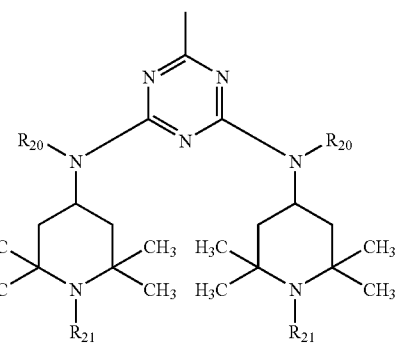

group.

A preferred stabilizer mixture is one wherein component (I) is selected from class (α-1) and component (II) is selected from class (β-1); or component (I) is selected from class (α-1) and component (II) is selected from class (β-2); or
component (I) is selected from class (α-1) and component (II) is selected from class (β-3); or
component (I) is selected from class (α-1) and component (II) is selected from class (β-4); or
component (I) is selected from class (α-2) and component (II) is selected from class (β-1); or
component (I) is selected from class (α-2) and component (II) is selected from class (β-2); or
component (I) is selected from class (α-2) and component (II) is selected from class (β-3); or
component (I) is selected from class (α-2) and component (II) is selected from class (β-4); or
component (I) is selected from class (α-3) and component (II) is selected from class (β-1); or
component (I) is selected from class (α-3) and component (II) is selected from class (β-2); or
component (i) is selected from class (α-3) and component (II) is selected from class (β-3); or
component (I) is selected from class (α-3) and component (II) is selected from class (β-4); or
component (I) is selected from class (α-4) and component (II) is selected from class (β-1); or
component (I) is selected from class (α-4) and component (II) is selected from class (β-2); or
component (I) is selected from class (α-4) and component (II) is selected from class (β-3); or
component (I) is selected from class (α-4) and component (II) is selected from class (β-4); or
component (i) is selected from class (α-5) and component (II) is selected from class (β-1); or
component (I) is selected from class (α-5) and component (II) is selected from class (β-2); or
component (I) is selected from class (α-5) and component (II) is selected from class (β-3); or
component (I) is selected from class (α-5) and component (II) is selected from class (β-4).

According to a preferred embodiment,
$m_1$ is 1, 2 or 4,
if $m_1$ is 1, $E_2$ is $C_{12}$-$C_{20}$alkyl,
if $m_1$ is 2, $E_2$ is $C_2$-$C_{10}$alkylene or a group of the formula (a-I)
$E_3$ is $C_1$-$C_4$alkyl,
$E_4$ is $C_1$-$C_6$alkylene, and
$E_5$ and $E_6$ independently of one another are $C_1$-$C_4$alkyl, and
if $m_1$ is 4, $E_2$ is $C_4$-$C_8$alkanetetrayl;
two of the radicals $E_7$ are —COO—($C_{10}$-$C_{15}$alkyl), and
two of the radicals $E_7$ are a group of the formula (a-II);
$E_9$ is $C_{10}$-$C_{14}$alkyl;
$E_{12}$ is $C_1$-$C_4$alkoxy;
the radicals $E_{15}$ independently of one another are $C_2$-$C_6$alkylene, and
the radicals $E_{16}$ independently of one another are $C_1$-$C_4$alkyl or $C_5$-$C_8$cycloalkyl;
$R_1$ and $R_3$ independently of one another are a group of the formula (b-I),
$R_2$ is $C_2$-$C_8$alkylene,
$R_4$ and $R_5$ independently of one another are hydrogen, $C_1$-$C_{12}$alkyl, $C_5$-$C_8$cycloalkyl or a group of the formula (b-I), or the radicals $R_4$ and $R_5$, together with the nitrogen atom to which they are bonded, form a 5- to 10-membered heterocyclic ring, and
$b_1$ is a number from 2 to 25;
$R_7$ and $R_{11}$ independently of one another are hydrogen or $C_1$-$C_4$alkyl,
$R_8$, $R_9$ and $R_{10}$ independently of one another are $C_2$-$C_4$alkylene, and
$X_1$, $X_2$, $X_3$, $X_4$, $X_5$, $X_6$, $X_7$ and $X_8$ independently of one another are a group of the formula (b-II),
$R_{12}$ is hydrogen, $C_1$-$C_4$alkyl, $C_5$-$C_8$cycloalkyl or a group of the formula (b-I);
$R_{14}$, $R_{15}$, $R_{16}$, $R_{17}$ and $R_{18}$ independently of one another are a direct bond or
$C_1$-$C_4$alkylene, and
$b_2$ is a number from 1 to 25;
$b'_3$, $b''_3$ and $b'''_3$ independently of one another are a number from 2 to 4, and
$R_{20}$ is hydrogen, $C_1$-$C_4$alkyl, $C_5$-$C_8$cycloalkyl, phenyl or benzyl.

A further preferred embodiment corresponds to
a stabilizer mixture, wherein
component (I) is a compound of the formula (A-1-a), (A-1-b), (A-1-c), (A-1-d), (A-2-a), (A-3-a), (A-4-a) or (A-5-a); and
component (II) is a compound of the formula (B-1-a), (B-1-b), (B-1-c), (B-2-a), (B-3-a) or a product (B-4-a);

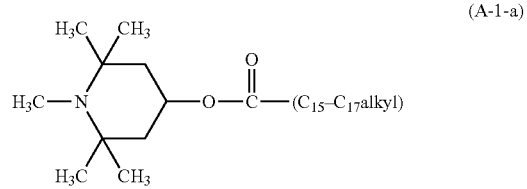

(A-1-a)

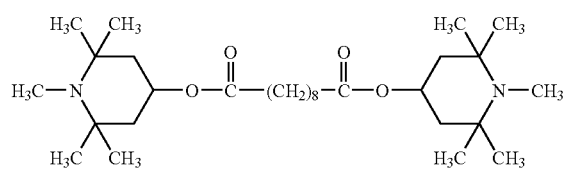

(A-1-b)

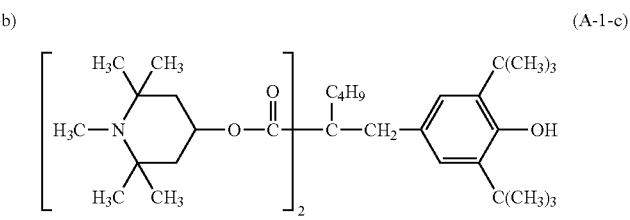

(A-1-c)

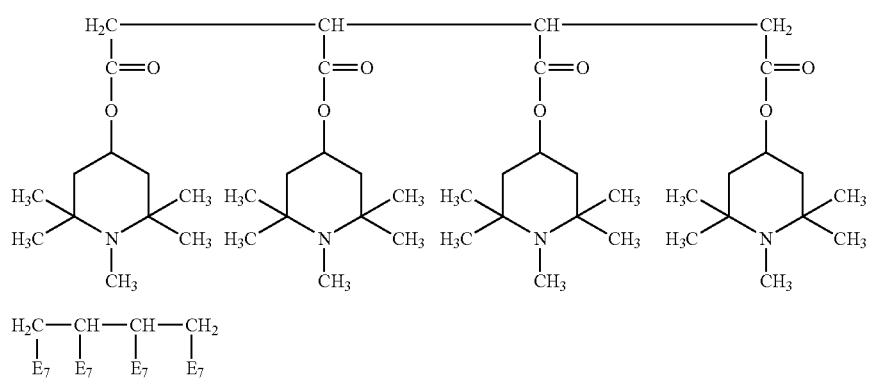 (A-1-d)
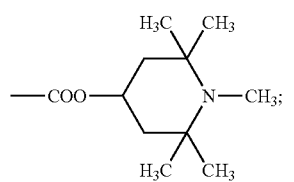 (A-2-a)
in which two of the radicals $E_7$ are —COO—$C_{13}H_{27}$ and two of the radicals $E_7$ are
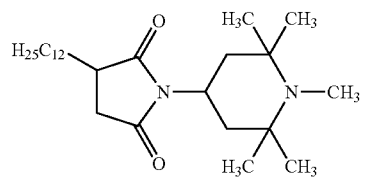 (A-3-a)
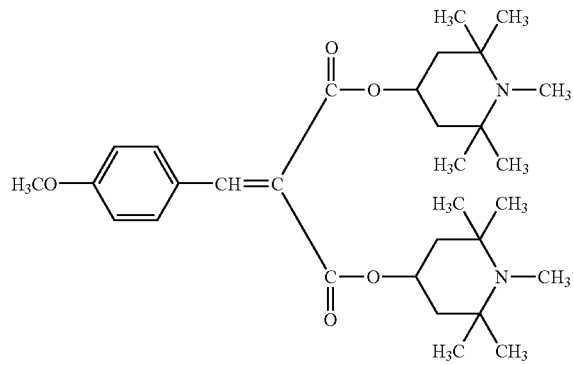 (A-4-a)
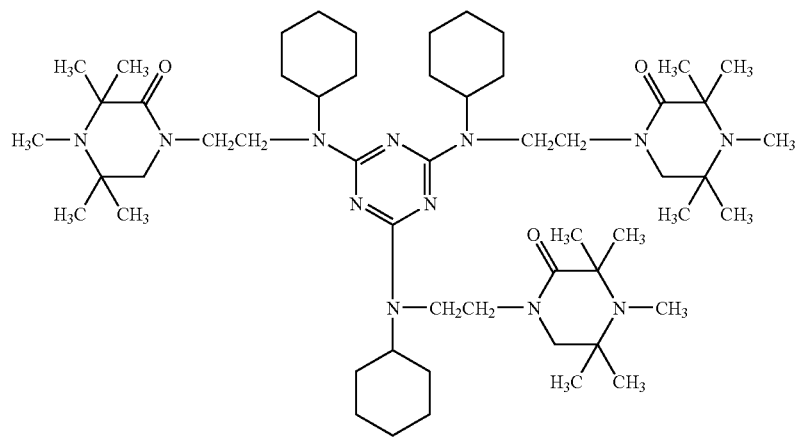 (A-5-a)

-continued
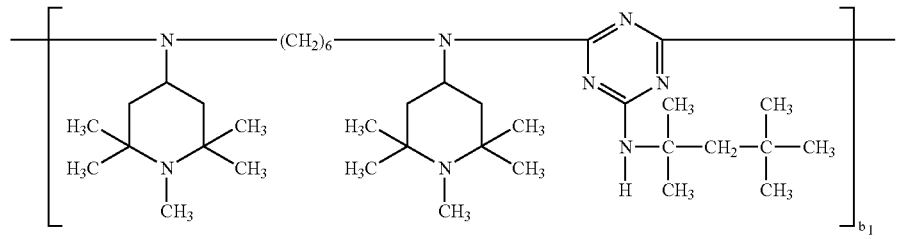
(B-1-a)
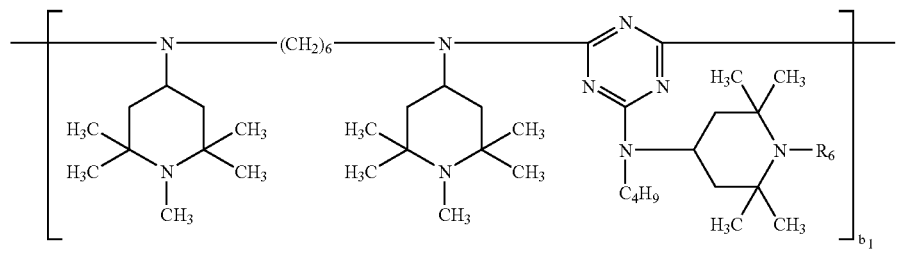
(B-1-b)
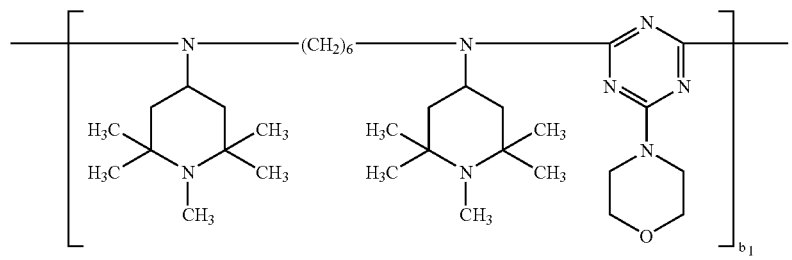
(B-1-c)
wherein $b_1$ is a number from 2 to 20;
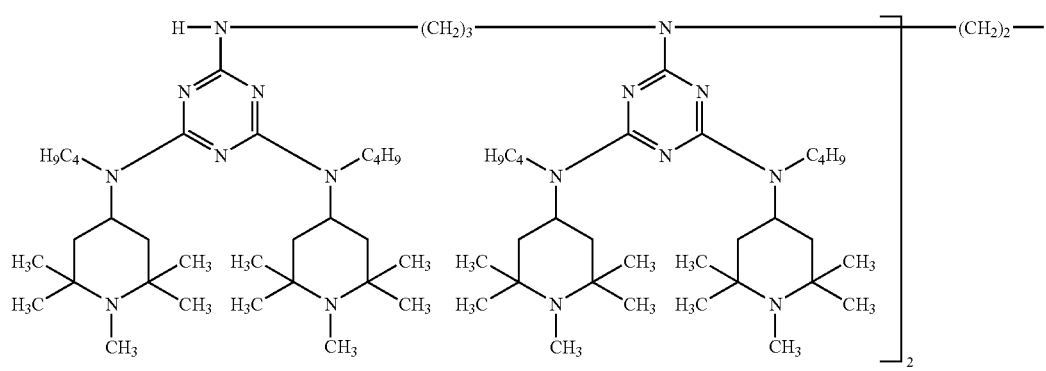
(B-2-a)

-continued

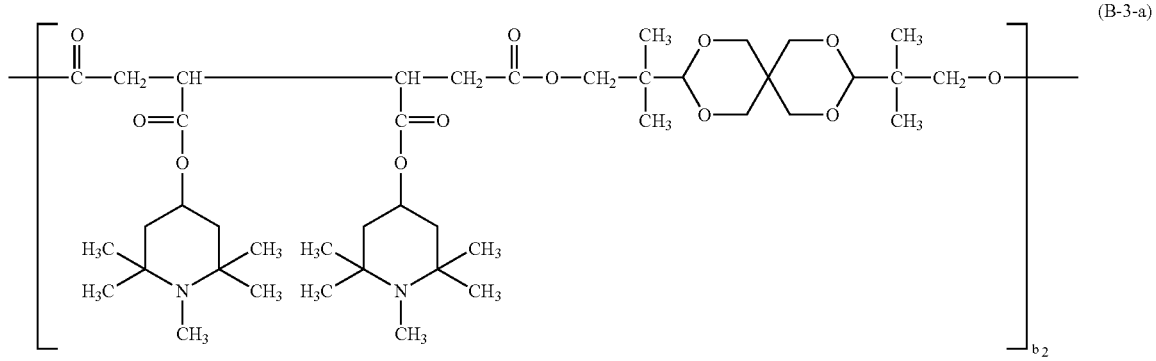

wherein $b_2$ is a number from 1 to 20;

a product (B-4-a) obtainable by reacting a product, obtained by reaction of a polyamine of the formula (B-4-2-1-a) with cyanuric chloride, with a compound of the formula (B-4-2-a).

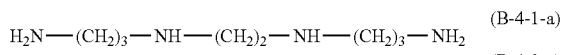

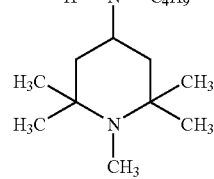

Component (I) is preferably the compound of the formula (A-1-a), (A-1-b), (A-1-c), (A-1-d), (A-2-a), (A-3-a), (A-4-a) or (A-5-a); and component (II) is preferably the compound of the formula (B-1-c) or (B-2-a).

Component (I) is in particular the compound of the formula (A-1-b) and component (II) is in particular the compound of the formula (B-1-c) or (B-2-a).

Preferred examples of stabilizer mixtures according to the present invention are:

1. Compound of the formula (A-1-a)+CHIMASSORB 119 (RTM)
2. TINUVIN 765 (RTM)+CHIMASSORB 119 (RTM)
3. TINUVIN 144 (RTM)+CHIMASSORB 119 (RTM)
4. ADK STAB LA-52 (RTM)+CHIMASSORB 119 (RTM)
5. ADK STAB LA-62 (RTM)+CHIMASSORB 119 (RTM)
6. SANDUVOR 3056 (RTM)+CHIMASSORB 119 (RTM)
7. SANDUVOR PR 31 (RTM)+CHIMASSORB 119 (RTM)
8. GOODRITE UV 3159 (RTM)+CHIMASSORB 119 (RTM)
9. Compound of the formula (A-1-a)+CYASORB UV 3529 (RTM)
10. TINUVIN 765 (RTM)+CYASORB UV 3529 (RTM)
11. TINUVIN 144 (RTM)+CYASORB UV 3529 (RTM)
12. ADK STAB LA-52 (RTM)+CYASORB UV 3529 (RTM)
13. ADK STAB LA-62 (RTM)+CYASORB UV 3529 (RTM)
14. SANDUVOR 3056 (RTM)+CYASORB UV 3529 (RTM)
15. SANDUVOR PR 31 (RTM)+CYASORB UV 3529 (RTM)
16. GOODRITE UV 3159 (RTM)+CYASORB UV 3529 (RTM)
17. Compound of the formula (A-1-a)+ADK STAB LA-63 (RTM)
18. TINUVIN 765 (RTM)+ADK STAB LA-63 (RTM)
19. TINUVIN 144 (RTM)+ADK STAB LA-63 (RTM)
20. ADK STAB LA-52 (RTM)+ADK STAB LA-63 (RTM)
21. ADK STAB LA-62 (RTM)+ADK STAB LA-63 (RTM)
22. SANDUVOR 3056 (RTM)+ADK STAB LA-63 (RTM)
23. SANDUVOR PR 31 (RTM)+ADK STAB LA-63 (RTM)
24. GOODRITE UV 3159 (RTM)+ADK STAB LA-63 (RTM)
25. Compound of the formula (A-1-a)+Compound of the formula (B-1-a)
26. TINUVIN 765 (RTM)+Compound of the formula (B-1-a)
27. TINUVIN 144 (RTM)+Compound of the formula (B-1-a)
28. ADK STAB LA-52 (RTM)+Compound of the formula (B-1-a)
29. ADK STAB LA-62 (RTM)+Compound of the formula (B-1-a)
30. SANDUVOR 3056 (RTM)+Compound of the formula (B-1-a)
31. SANDUVOR PR 31 (RTM)+Compound of the formula (B-1-a)
32. GOODRITE UV 3159 (RTM)+Compound of the formula (B-1-a)
33. Compound of the formula (A-1-a)+Compound of the formula (B-1-b)
34. TINUVIN 765 (RTM)+Compound of the formula (B-1-b)
35. TINUVIN 144 (RTM)+Compound of the formula (B-1-b)
36. ADK STAB LA-52 (RTM)+Compound of the formula (B-1-b)
37. ADK STAB LA-62 (RTM)+Compound of the formula (B-1-b)
38. SANDUVOR 3056 (RTM)+Compound of the formula (B-1-b)
39. SANDUVOR PR 31 (RTM)+Compound of the formula (B-1-b)
40. GOODRITE UV 3159 (RTM)+Compound of the formula (B-1-b)
41. Compound of the formula (A-1-a)+Product (B-4-a)
42. TINUVIN 765 (RTM)+Product (B-4-a)
43. TINUVIN 144 (RTM)+Product (B-4-a)
44. ADK STAB LA-52 (RTM)+Product (B-4-a)
45. ADK STAB LA-62 (RTM)+Product (B-4-a)
46. SANDUVOR 3056 (RTM)+Product (B-4-a)
47. SANDUVOR PR 31 (RTM)+Product (B-4-a)
48. GOODRITE UV 3159 (RTM)+Product (B-4-a)

The commercial product TINUVIN 765 (RTM) corresponds to the compound of the formula (A-1-b).

The commercial product TINUVIN 144 (RTM) corresponds to the compound of the formula (A-1-c).

The commercial product ADK STAB LA-52 (RTM) corresponds to the compound of the formula (A-1-d).

The commercial product ADK STAB LA-62 (RTM) corresponds to the compound of the formula (A-2-a).

The commercial product SANDUVOR 3056 (RTM) corresponds to the compound of the formula (A-3-a).

The commercial product SANDUVOR PR 31 (RTM) corresponds to the compound of the formula (A-4-a).

The commercial product GOODRITE UV 3159 (RTM) corresponds to the compound of the formula (A-5-a).

The commercial product CHIMASSORB 119 (RTM) corresponds to the compound of the formula (B-2-a).

The commercial product CYASORB UV 3529 (RTM) corresponds to the compound of the formula (B-1-c).

The commercial product ADK STAB LA-63 (RTM) corresponds to the compound of the formula (B-3-a).

A further preferred embodiment of this invention relates to a stabilizer mixture containing additionally
(X-1) a pigment or
(X-2) an UV absorber or
(X-3) a pigment and an UV absorber.

The pigment (component (X-1)) may be an inorganic or organic pigment.

Examples of inorganic pigments are titanium dioxide, zinc oxide, carbon black, cadmium sulfide, cadmium selenide, chromium oxide, iron oxide, lead oxide and so on.

Examples of organic pigments are azo pigments, anthraquinones, phthalocyanines, tetrachloroisoindolinones, quinacridones, isoindolines, perylenes, pyrrolopyrroles (such as Pigment Red 254) and so on.

All pigments described in "Gächter/Müller: Plastics Additives Handbook, 3rd Edition, Hanser Publishers, Munich Vienna N.Y.", page 647 to 659, point 11.2.1.1 to 11.2.4.2 can be used as component (X-1).

A particularly preferred pigment is titanium dioxide, optionally in combination with an organic pigment.

Examples of such organic pigments are:

C.I. (Colour Index) Pigment Yellow 93, C.I. Pigment Yellow 95, C.I. Pigment Yellow 138, C.I. Pigment Yellow 139, C.I. Pigment Yellow 155, C.I. Pigment Yellow 162, C.I. Pigment Yellow 168, C.I. Pigment Yellow 180, C.I. Pigment Yellow 183, C.I. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

Examples of the UV absorber (component (X-2)) are a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

The 2-(2'-hydroxyphenyl)benzotriazole is e.g. 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$ where R=3'-tert-butyl-4'-hydroxy-5'-2H-benzotriazol-2-ylphenyl.

2-(3',5'-Di-tert-butyl-2'-hydroxyphenyl)-5-chloro-benzotriazole, 2-(3'-tert-butyl-2'-hydroxy-5'-methylphenyl)-5-chloro-benzotriazole and 2-(3',5'-di-tert-amyl-2'-hydroxyphenyl)-benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl α-cyano-β,β-diphenylacrylate, isooctyl α-cyano-β,β-diphenylacrylate, methyl α-carbomethoxycinnamate, methyl α-cyano-β-methyl-β-methoxy-cinnamate, butyl α-cyano-β-methyl-p-methoxy-cinnamate, methyl α-carbomethoxy-p-methoxycinnamate or N-(β-carbomethoxy-β-cyanovinyl)-2-methylindoline.

The oxamide is for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxy-disubstituted oxanilides or mixtures of o- and p-ethoxy-disubstituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4, 6-bis(2,4-dimethyl)-1,3,5-triazine, 2-[2-hydroxy-4-(2-hydroxy-3-octyloxy-propyloxy)phenyl]4,6-bis(2,4-dimethyl)-1,3,5-triazine, 2-[4-(dodecyloxy/tridecyloxy-2- hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine or 2-(2-hydroxyphenyl)-4-(4-methoxyphenyl)-6-phenyl-1,3,5-triazine.

2-(2-Hydroxy-4-octyloxyphenyl)-4,6-bis(2,4-dimethylphenyl)-1,3,5-triazine and 2-(2-hydroxy-4-hexyloxy)phenyl-4,6-diphenyl-1,3,5-triazine are preferred.

The monobenzoate of resorcinol is for example the compound of the formula

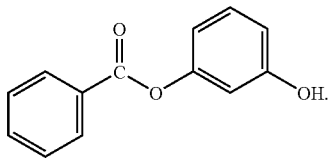

The formamidine is for example the compound of the formula

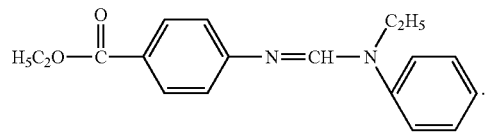

The UV absorber is in particular a 2-(2'-hydroxyphenyl)benzotriazole, a 2-hydroxybenzophenone or a hydroxyphenyltriazine.

The stabilizer mixture according to this invention is suitable for stabilizing organic materials against degradation induced by light, heat or oxidation. Examples of such organic materials are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), or polyvinyl cyclohexane.

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or α-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, Ia and/or IIIa of the Periodic Table. The activators may be modified conveniently with further ester, ether, amine or silyl ether groups. These catalyst systems are usually termed Phillips, Standard Oil Indiana, Ziegler (-Nafta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.
8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.

This invention therefore additionally relates to a composition comprising an organic material subject to degradation induced by light, heat or oxidation and the stabilizer mixture described above.

A further embodiment of the present invention is a method for stabilizing an organic material against degradation induced by light, heat or oxidation, which comprises incorporating into the organic material the stabilizer mixture described above.

The organic material is preferably a synthetic polymer, in particular from one of the above groups. Polyolefins are preferred and polyethylene, polypropylene, a polyethylene copolymer or a polypropylene copolymer are particularly preferred. Polypropylene containing talc and/or other fillers (e.g. $CaCO_3$) is also preferred. Pigmented polyolefins and pigmented polyamides are further preferred. Acrylonitrile/butadiene/styrene is also preferred as organic material.

The components (I), (II) and optionally (X-1) and/or (X-2) may be added to the organic material to be stabilized either individually or mixed with one another.

The total amount of the two sterically hindered amine compounds (components (I) and (II)) in the organic material to be stabilized is preferably 0.005 to 5%, in particular 0.01 to 1% or 0.05 to 1%, relative to the weight of the organic material.

The pigment (component (X-1)) is optionally present in the organic material in an amount of preferably 0.01 to 10%, in particular 0.05 to 1%, relative to the weight of the organic material.

The UV absorber (component (X-2)) is optionally present in the organic material in an amount of preferably 0.01 to 1%, in particular 0.05 to 0.5%, relative to the weight of the organic material.

The total amount of component (X-3) (the pigment in combination with the UV absorber) is preferably 0.01 to 10%, relative to the weight of the organic material. The weight ratio of the UV absorber to the pigment is for example 2:1 to 1:10.

When the pigment used is titanium dioxide in combination with an organic pigment as described above, titanium dioxide is preferably present in the organic material in an amount of 0.01 to 5%, relative to the weight of the organic material, and the organic pigment may be present in an amount of, for example, 0.01 to 2%, relative to the weight of the organic material.

The weight ratio of components (I):(II) is for example 1:10 to 10:1, preferably 1:5 to 5:1, in particular 1:2 to 2:1.

The weight ratio of the components (I) and (II):(X-1) is for example 1:100 to 10:1, preferably 1:5 to 5:1, in particular 1:2 to 2:1.

The weight ratio of the components (I) and (II):(X-2) is for example 1:5 to 20:1, preferably 1:2 to 2:1.

The weight ratio of the components (I) and (II):(X-3) is for example 1:100 to 10:1, preferably 1:5 to 5:1, in particular 1:2 to 2:1.

The above components can be incorporated into the organic material to be stabilized by known methods, for example before or during shaping or by applying the dissolved or dispersed compounds to the organic material, if necessary with subsequent evaporation of the solvent. The components can be added to the organic material in the form of a powder, granules or a masterbatch, which contains these components in, for example, a concentration of from 2.5 to 25% by weight.

If desired, the components (I) and (II) and optionally (X-1) and/or (X-2) can be melt blended with each other before incorporation in the organic material. They can be added to a polymer before or during the polymerization or before the crosslinking.

The materials stabilized according to this invention can be used in a wide variety of forms, for example as films, fibres, tapes, moulding compositions, profiles or as binders for paints, adhesives or putties.

The stabilized material may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butyl-phenol, 2,6-di-tert-butyl-4-isobutylphenol, 2,6-dicyclopentyl-4-methylphenol, 2-α-methylcyclohexyl)-4,6-dimethylphenol, 2,6-dioctadecyl-4-methylphenol, 2,4,6-tri-cyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2;3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzyl-phosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of D-(3,5-di-tert-butyl-4-hydroxyphenyl)proiionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of D-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated di-phenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-di-hydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers

Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxy-phenylpropionyl) hydrazine, 3-salicyloylamino-1,2,4-triazole, bis(benzylidene)-oxalyl dihydrazide, oxanilide, isophthaloyl dihydrazide, sebacoyl bisphenyl-hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris (2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz [d,g]-1,3,2-dioxaphosphocin, 6-fluoro-2,4,8,10-tetra-tert-butyl-12-methyl-dibenz[d,g]-1,3,2-dioxaphosphocin, bis(2, 4-di-tert-butyl-6-methylphenyl)methylphosphite, bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methylnitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio of the total amount of components (I) and (II) and optionally (X-1) and/or (X-2) to the total amount of the conventional additives can be, for example, 100:1 to 1:100.

The example below illustrates the invention in greater detail. All percentages and parts are by weight, unless stated otherwise.

Stabilizers used in the following Example 1:

Compound (A-1-b):

(TINUVIN 765 (RTM))

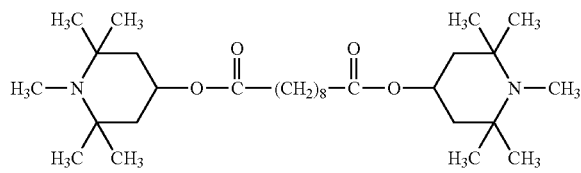

Compound (B-2-a):

(CHIMASSORB 119 (RTM))

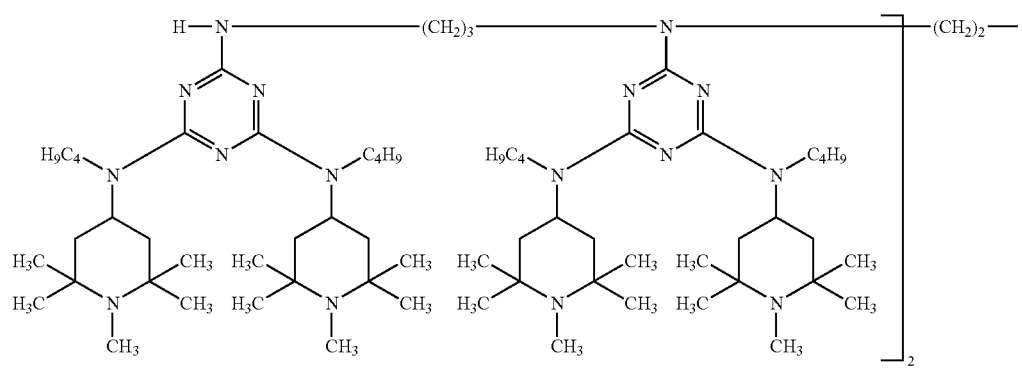

EXAMPLE I

Light Stabilization of Polypropylene Homopolymer Films 100 parts of unstabilized polypropylene powder (melt flow index: 2.4 g/10 minutes at 230° C. and 2160 g) are homogenized at 200° C. for 10 minutes in a Brabender plastograph with 0.05 parts of pentaerythrityl tetrakis{3-(3,5-di-tert-butyl-4-hydroxyphenyl)propionate}, 0.05 parts of tris{2,4-di-tert-butylphenyl} phosphite, 0.1 parts of Ca stearate, 0.25 parts of titanium dioxide (anatase) and the light stabilizer system indicated in Table 1. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 in hours ($T_{0.1}$) is a measure for the efficiency of the stabilizer system.

The synergistic effect of two coadditivs (($\alpha$) and ($\beta$)) is determined by a comparison of the calculated $T_{0.1}$ value with the actually measured $T_{0.1}$ value. The $T_{0.1}$ values are calculated on the basis of the additivity law (B. Ranby and J. F. Rabek; Photodegradation, Photo-oxidation and Photostabilization of Polymers, Principles and Applications, John Wiley & Sons, London, New York, Sydney, Toronto, 1975, pages 418 and 419) according to the following equation:

$$\text{Expected stabilizing activity} = \frac{\text{Stabilizing activity of } 100\% \ (\alpha) + \text{stabilizing activity of } 100\% \ (\beta)}{2}$$

There is a synergistic effect for the two coadditivs in question, when $T_{0.1 \ measured} > T_{0.1 \ calculated}$.

TABLE 1

| Light stabilizer system | $T_{0.1}$ (h) (measured) | $\frac{(T_{0.1})\alpha + (T_{0.1})\beta}{2}$ (h) ( = $T_{0.1}$ calculated) |
|---|---|---|
| without | 390 | |
| 0.2% of Compound (A-1-b) | 4630 | |
| 0.2% of Compound (B-2-a) | 2460 | |
| 0.1% of Compound (A-1-b) + 0.1% of Compound (B-2-a) | >5475 | 3545 |

The combination of the compounds (A-1-b) and (B-2-a) shows a synergistic effect.

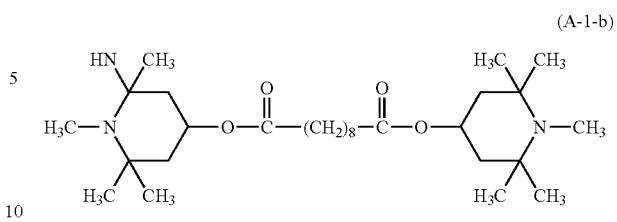
(A-1-b)

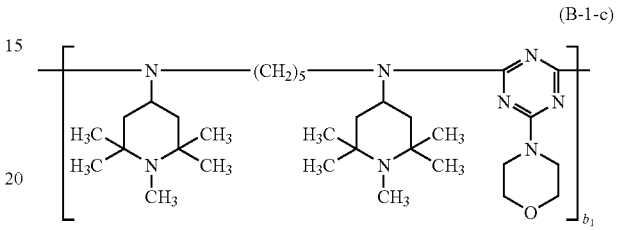
(B-1-c)

wherein $b_1$ is a number from 2 to 20;

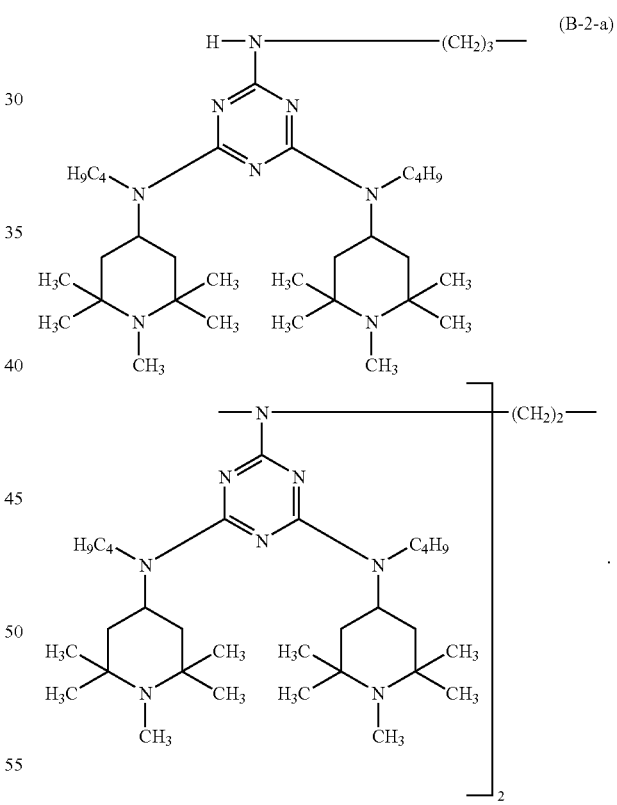

The invention claimed is:

1. A stabilizer mixture containing a compound of the formula (A-1-b), and (II) a compound of the formula (B-1-c) or (B-2-a)

2. A stabilizer mixture according to claim 1, which additionally contains as a further component
   (X-1) a pigment or
   (X-2) an UV absorber or
   (X-3) a pigment and an UV absorber.

3. A composition comprising an organic material subject to degradation induced by light, heat or oxidation and a stabilizer mixture according to claim 1.

4. A composition according to claim 3 wherein the organic material is a synthetic polymer.

5. A composition according to claim 3 wherein the organic material is a polyolefin.

6. A composition according to claim 3 wherein the organic material is polyethylene, polypropylene, a polyethylene copolymer or a polypropylene copolymer.

7. A composition according to claim 3 wherein the organic material is acrylonitrile/butadiene/styrene (ABS).

8. A method for stabilizing an organic material against degradation induced by light, heat or oxidation, which comprises incorporating into the organic material a stabilizer mixture according to claim 1.

* * * * *